US012076847B2

(12) United States Patent
Kwok

(10) Patent No.: US 12,076,847 B2
(45) Date of Patent: Sep. 3, 2024

(54) HANDLE OF ASSEMBLY TOOL WITH AN ADJUSTABLE CENTER OF GRAVITY

(71) Applicant: Jiminox Limited, Kowloon (HK)

(72) Inventor: Ngok Wing Jimmy Kwok, Kowloon (HK)

(73) Assignee: JIMINOX LIMITED, Kowloon (HK)

( * ) Notice: Subject to any disclaimer, the term of this patent is extended or adjusted under 35 U.S.C. 154(b) by 395 days.

(21) Appl. No.: 17/556,965

(22) Filed: Dec. 20, 2021

(65) Prior Publication Data

US 2022/0241954 A1 Aug. 4, 2022

(30) Foreign Application Priority Data

Jan. 29, 2021 (CN) ......................... 202110122992.5

(51) Int. Cl.
*B25G 1/00* (2006.01)
*B26B 3/00* (2006.01)

(52) U.S. Cl.
CPC . *B25G 1/00* (2013.01); *B26B 3/00* (2013.01)

(58) Field of Classification Search
CPC .. B25G 1/00; B25G 1/10; B25G 1/102; B26B 1/00–10
USPC ........................................... 30/340, 342–344
See application file for complete search history.

(56) References Cited

U.S. PATENT DOCUMENTS 2,235,792 A * 3/1941 Bauman .................. A47J 45/08 16/431
4,470,327 A * 9/1984 Gerber, Jr. ................ B26B 3/00 D7/649
5,873,148 A * 2/1999 Arnold ................... B25G 1/102 81/177.1
7,024,969 B2 * 4/2006 Smith ..................... B25B 13/04 81/177.2
7,856,910 B2 * 12/2010 Kwok ....................... B26B 3/00 83/13
8,191,267 B2 * 6/2012 Patel .................. E04F 21/1652 30/342

(Continued)

FOREIGN PATENT DOCUMENTS

CN 1709653 A 12/2005
CN 202378066 U 8/2012

(Continued)

OTHER PUBLICATIONS

Search report for HK Application 32021024558.7, Feb. 1, 2021.

*Primary Examiner* — Adam J Eiseman
*Assistant Examiner* — Richard D Crosby, Jr.
(74) *Attorney, Agent, or Firm* — MUNCY, GEISSLER, OLDS & LOWE, PC

(57) ABSTRACT

A handle of assembly tool with an adjustable center of gravity includes a tongue piece and a tube that are connected to a functional part in the tool. A through hole is formed in the tongue piece. First and second plates are arranged on the tongue piece. The first plate is provided with a first buckle, a first slot, a first fixing hole and a first groove; the second plate is provided with a second buckle, a second slot, a second fixing hole and a second groove; a fixing part is formed in the first and second slots; a locking part is formed in the first and second grooves; the tube is connected with the first and second fixing plates, and a gasket is formed at the other end of the tube with a locking rod passed through; a weight unit is connected with the locking rod.

10 Claims, 6 Drawing Sheets

(56) References Cited

U.S. PATENT DOCUMENTS

| | | | | |
|---|---|---|---|---|
| 8,205,341 | B2 * | 6/2012 | Rosso | E04F 21/165<br>30/169 |
| 10,377,031 | B2 * | 8/2019 | Wood | B26B 3/00 |
| 10,603,781 | B1 * | 3/2020 | Price | B25G 1/04 |
| 10,682,776 | B1 * | 6/2020 | Schmerler | B25G 3/36 |
| 11,273,566 | B2 * | 3/2022 | Gklezos | B26B 21/522 |
| 11,370,132 | B2 * | 6/2022 | Tsai | B26B 9/02 |
| 2010/0192382 | A1 * | 8/2010 | Burch | B23D 61/123<br>83/697 |
| 2012/0151777 | A1 * | 6/2012 | Ritter | B26B 3/00<br>30/165 |
| 2017/0136617 | A1 * | 5/2017 | Lucas, Jr. | B25G 1/06 |
| 2017/0291292 | A1 * | 10/2017 | Busato | B25G 3/04 |
| 2018/0056529 | A1 * | 3/2018 | Liu | B25G 1/00 |
| 2018/0056530 | A1 * | 3/2018 | Liu | B25G 1/00 |
| 2018/0056531 | A1 * | 3/2018 | Liu | B26B 3/00 |
| 2018/0169850 | A1 * | 6/2018 | Reissmann | B25G 3/30 |
| 2018/0169852 | A1 * | 6/2018 | Fryer-Biggs | B25G 1/102 |
| 2018/0169877 | A1 * | 6/2018 | Liu | B25G 1/102 |
| 2018/0250841 | A1 * | 9/2018 | Scimone | A44C 9/0053 |
| 2019/0118398 | A1 * | 4/2019 | Kärnä | B25G 1/04 |
| 2019/0210232 | A1 * | 7/2019 | Tsai | B26B 3/03 |
| 2020/0181926 | A1 * | 6/2020 | Creasman | E04F 21/026 |

FOREIGN PATENT DOCUMENTS

| | | | |
|---|---|---|---|
| CN | 206383175 | U | 8/2017 |
| CN | 206748481 | U | 12/2017 |
| EP | 0686461 | B1 | 11/1998 |

* cited by examiner

HANDLE OF ASSEMBLY TOOL WITH AN ADJUSTABLE CENTER OF GRAVITY

TECHNICAL FIELD

The present invention pertains to the technical field of handheld tools, particularly to a handle of assembly tool with an adjustable center of gravity.

BACKGROUND ART

At present, most of the tool handles of the tools and replaceable tool heads on the market are integrally formed. Even if there is a design according to which the tool handle can be replaced, its structure is complex, many parts are involved and the replacement steps are cumbersome. Moreover, most of the handles of assembly tools are not durable and can hardly cope with the various movements of the handheld tools during operation. Often assembly tools will cause the handle parts to become loose due to long-term use. In addition to affecting work efficiency, loose handles may also cause accidents.

Further, with the popularity of personalization, people not only have requirements for the color, shape and material of the tools, but also have requirements for the operating performance of the tools. In the technical field of handheld tools, the center of gravity of the tool has been neglected for a long time, so there is no design that allows users to adjust the center of gravity of the tool by themselves. If a tool with an inappropriate center of gravity is used for a long time, it will easily cause hand fatigue and damage, which will affect work efficiency and make it difficult to use for a long time. On the contrary, the design of a tool with an adjustable center of gravity can effectively improve efficiency. For example, kitchen knives with different centers of gravity will have different feel and strength for users in different actions such as chopping, cutting and planing. If the center of gravity can be adjusted according to the purpose of the tool, it will essentially meet the need of personalization.

Therefore, those skilled in the art have always hoped to provide a handle of assembly tool with an adjustable center of gravity, which is convenient for disassembly and can be matched with different tool heads and tool handles and can adjust according to personal preferences the handheld tools that meet ergonomic requirements.

SUMMARY OF THE INVENTION

An object of the present invention is to provide a handle of assembly tool with an adjustable center of gravity to solve the problem mentioned in the above Background Art.

In order to achieve the foregoing object, the present invention provides the following technical solution.

A handle of assembly tool with an adjustable center of gravity, comprising a tongue piece and a tube, which are connected to a functional part in the tool, is provided. Three through holes are formed in the tongue piece, a first plate and a second plate are arranged on both sides of the tongue piece, the first plate is provided with a first buckle, a first slot, a first fixing hole and a first groove, the second plate is provided with a second buckle, a second slot, a second fixing hole and a second groove, a fixing part is formed in the first slot and the second slot, a locking part is formed in the first groove and the second groove, one end of the tube is connected to the first plate and the second plate, a gasket is formed at the other end of the tube with a locking rod passed through, a weight unit located in the tube is connected with the locking rod, and the locking rod is inserted into the tube to connect with the locking part.

Preferably, the first buckle is matched with the second slot, and the second buckle is matched with the first slot.

Preferably, the locking part is a nut, and the locking rod is a screw.

Preferably, the fixing part is a screw and a nut.

Preferably, the inner cavity of the tube is provided with a baffle between the inner washer and the locking part and against the inner washer.

Preferably, an inner washer is further provided between the locking part and the locking rod.

Preferably, at least two weight units are connected with the locking rod, and are mutually separated with a gasket unit.

Preferably, a flange is arranged on the first plate or the second plate, extends and protrudes along the outer edge of the tongue piece, and blocks the tongue piece from swinging up and down.

Preferably, outer pits are arranged on the outer surfaces of the first plate and the second plate, and an outer gasket is nested in the outer pits.

Preferably, the gasket comprises an inner washer, a soft gasket and an outer gasket in turn, and the outer gasket is exposed.

Compared with the prior art, the present invention has the following advantages: The tool handle provided by the present invention is convenient for installation and disassembly, the center of gravity of the tool can be adjusted by the user to ease the uncomfortable hand feelings, and the user may switch with different colors, sizes, materials of handles for personalization.

DESCRIPTION OF REFERENCE SIGN

Figure 1A:
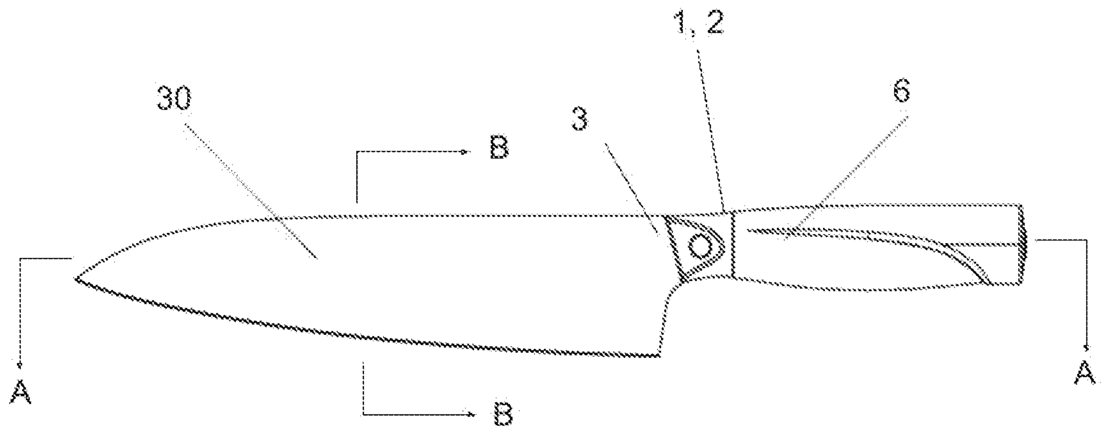
FIG. 1A is a structural schematic view of an embodiment of the present invention.

1—first plate, 11—first buckle, 14—first fixing hole, 16—first slot, 17—first groove, 18—outer pit, 19—flange, 2—second plate, 21—second buckle, 24—second fixing hole, 25—boss, 26—second slot, 27—second groove, 28—outer pit, 29—flange, 3—tongue piece, 30—functional part, 31—through hole, 32—through hole, 34—third fixing hole, 4—fixing part, 5—locking part, 6—tube, 61—baffle, 7—weight unit, 8—locking rod, 9—gasket, 91—inner washer, 92—inner gasket, 93—soft gasket, 94—outer gasket, 90—gasket unit.

DETAILED DESCRIPTION

In the description of the present invention, it should be understood that the terms indicating directional or positional relations such as "over," "on," "above," "below," "under," "front," "rear," "left", "right", "top", "bottom", "head", "tail", "inside", "inner", "internal", "outside", "outer" and "external" are based on the directional or positional relations shown in the drawings. They are only for facilitating and simplifying the description of the present invention, and do not indicate or imply that the devices or elements in question must possess specific directions or be constructed and operated in specific directions, so they cannot be understood as limitations to the present invention.

The figures in an embodiment of the present invention show a kitchen knife, and the functional part of the tool is a blade. However, the applications of the present invention are not limited to kitchen ware, and the functional part of the tool can be a screwdriver, an awl, a shovel, etc. The functional part and tongue piece in the tool can be formed integrally, or combined and assembled by other means. The key of the present invention is the assembly and combination of the handle on the tool, so it is not limited by the functional part on the tool.

Figure 1B:
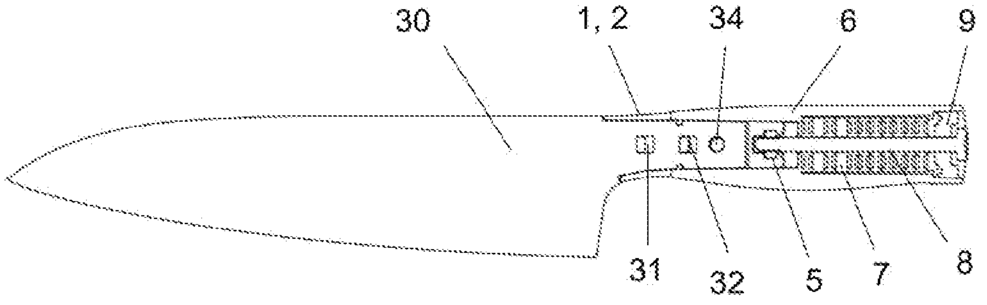
FIG. 1B is a front sectional view of an embodiment of the present invention.
Figure 1C:
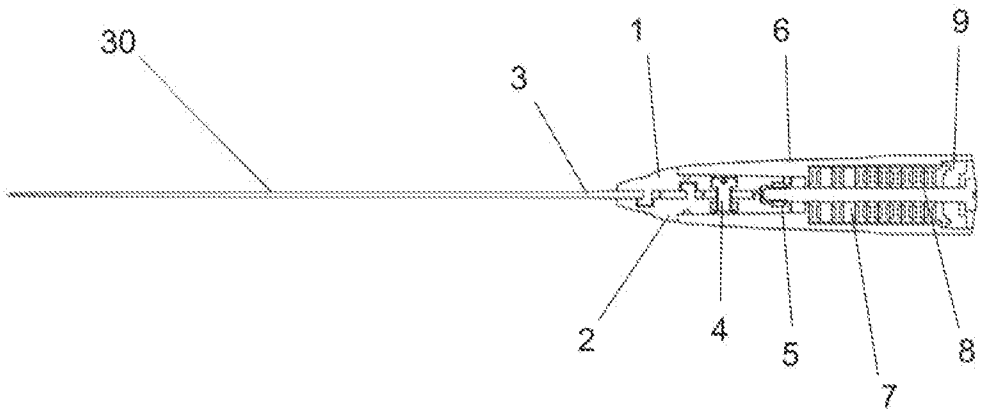
FIG. 1C is a top A-A sectional view of the embodiment shown in FIG. 1A.

Refer to FIG. 1A to FIG. 1C. The present invention provides a solution: a handle of assembly tool with an adjustable center of gravity, comprising a tongue piece 3 connected to the functional part 30 in the tool, a first plate 1, a second plate 2 and a tube 6. The functional part 30 in the tool may refer to the application part of an ordinary tool after removal of the handle. For example, the spoon part in a soup ladle can be regarded as the functional part 30 mentioned in the present invention.

FIG. 1A shows that a tongue piece 3 is partially concealed between a first plate 1 and a second plate 2, and the first plate 1 and the second plate 2 are also partially concealed in a tube 6, which is the holding position of a user. This layer-by-layer structure can enhance the user's power transmission, and can also make the tool have a more reliable structure, allowing the tool to be locked when moving left and right, swinging up and down, being pushed and pulled in the front and rear directions, and rotating in all directions.

As shown in FIG. 1B and FIG. 1C, three through holes 31, 32 and 34 are formed in the tongue piece 3, the first plate 1 and the second plate 2 pass through the through holes 31 and 32, respectively, and a fixing part 4 passes through a third fixing hole 34 to further fix the tongue piece 3. A locking part 5 is arranged at the ends of the first plate 1 and the second plate 2 adjacent to the tail of the handle, the first plate 1 and the second plate 2 are matched with each other and nested into one end (the tool head end) of the tube 6, and the locking part 5 is connected with a locking rod 8. The tail of the locking rod 8 is inserted into a gasket 9. When the locking rod 8 is tightened, the gasket 9 is brought into the other end (tail end) of the tube 6 and seals the inner cavity of the tube 6.

The foregoing structure can fix the swing of an assembly tool during operation in three-dimensional directions and reduce the loosening and displacement of internal structures. The plates can limit the left and right movement and up and down swing of the tongue piece, the cooperation of the tube and the plates can further limit the left and right and up and down swings of the tongue piece, the cooperation of the locking rod and the plates limits the push and pull in the front and rear directions, and the combination of the tube, the plates and the locking rod limits the axial rotational movement of the tool. Further, in order to realize the function of adjusting the center of gravity on the handle of an assembly tool, a weight unit 7 is provided on the locking rod 8 and arranged in the inner cavity of the tube 6. Further, the weight unit 7 is designed to be hollow in the middle, can be sleeved on the locking rod 8 for movement and is configured in different axial positions to achieve the purpose of adjusting the center of gravity of the tool.

In an embodiment, the locking part 5 is a nut, the locking rod 8 is a screw, and the first plate 1 and the second plate 2 can fix the nut. The user can fasten the screw at the tail end of the tube 6 to tighten the entire handle of the assembly tool.

In another embodiment, the gasket 9 is made of an elastic material, which can seal the tail end of the tube 6 when being compressed. When working in a water environment, the gasket 9 has a waterproof function and prevents water drops from flowing into the inner cavity of the tube and affecting the durability of the tool.

In another embodiment, three through holes 31, 32 and 34 on the tongue piece 3 are coaxially arranged and are in the same axial direction as the locking rod 8.

FIG. 2A to FIG. 2E show a further technical solution provided by the present invention and more specifically exhibit further technical features of the components in the present invention.

Figure 2A:
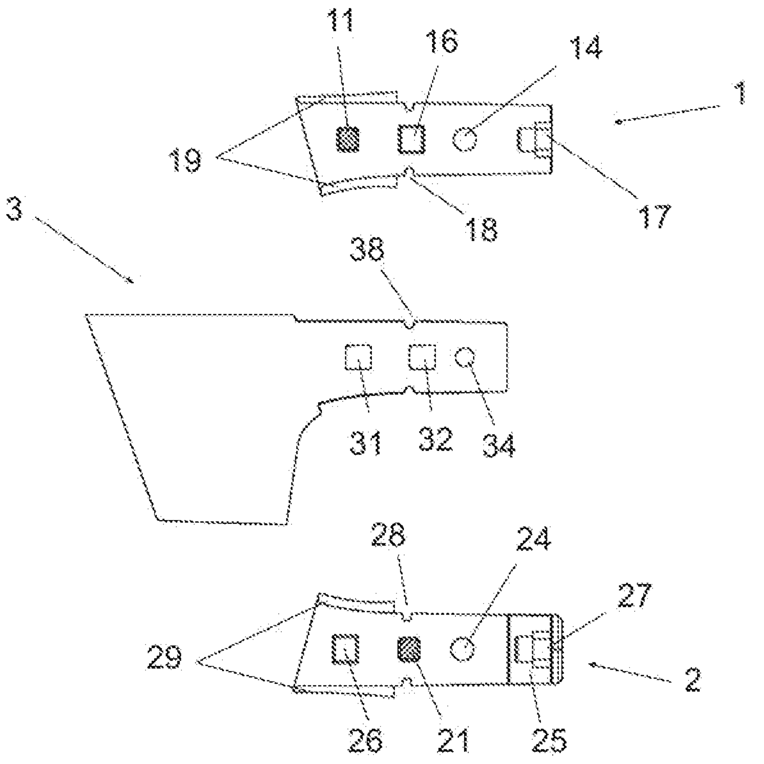
FIG. 2A is a partial structural schematic view of the present invention.

FIG. 2A show three components in the present invention, including the first plate 1, the second plate 2 and the tongue piece 3. The first plate 1 and the second plate 2 have similar structures and their major difference is that the positions of buckles 11 and 21 and slots 16 and 26 are mismatched with each other. To be specific, the end (tool head end) of the first plate 1 adjacent to the tongue piece is provided with a first buckle 11 and a first slot 16; the end (tool head end) of the second plate 2 adjacent to the tongue piece 3 is provided with a second buckle 21 and a second slot 26; the first buckle 11 runs through the tongue piece 3 and is buckled with the second slot 26, and accordingly, the second buckle 21 runs through the tongue piece 3 and is buckled with the first slot 16.

Meanwhile, the other ends (tail ends) of the first plate 1 and the second plate 2 are both provided with fixing holes 14 and 24 and grooves 17 and 27. The fixing holes 14 and 24 are in the same size as the third fixing hole 34 on the tongue piece 3, and the fixing part 4 runs through the fixing holes 14, 24 and 34 on three components to further lock the tongue piece 3 and limit the movement of the tongue piece 3. The fixing part 4 can be a screw and a nut. A locking part 5 is arranged inside the slots 17 and 27 to connect the locking rod 8, so that the tube is connected to the plates.

In an embodiment, outer pits 18 and 28 are arranged on the outer surfaces of the ends of the first plate 1 and the second plate 2 adjacent to the tongue piece 3, and an outer gasket is sleeved on the outer pits 18 and 28, encircles the first plate 1 and the second plate 2, and fastens the first plate 1 and the second plate 2. When the tube 6 is sleeved on the first plate 1 and the second plate 2, the outer gasket on the outer pits 18 and 28 is further tensioned to improve the stability of the tube and the plates and prevent water or dirt from flowing into the inner cavity of the tube 6 from the space between the first plate and the second plate.

In another embodiment, in order to further improve the power transmission when the tool is being used, bosses can be arranged at the ends of the plates. The bosses can be arranged on the first plate 1 and/or the second plate 2.

Anyway, the total thickness of the bosses shall not exceed the thickness of the tongue piece, so that the tongue piece can be firmly clamped between the two plates. In a preferred embodiment, when a boss is arranged only on one of the plates, the boss can be in an "L" shape. One end of the L-shaped boss blocks the tail end of the tongue piece, and the other end blocks the other plate, so that the entire tool obtains a greater support during the reciprocating motion in the axial direction.

Figure 2B:
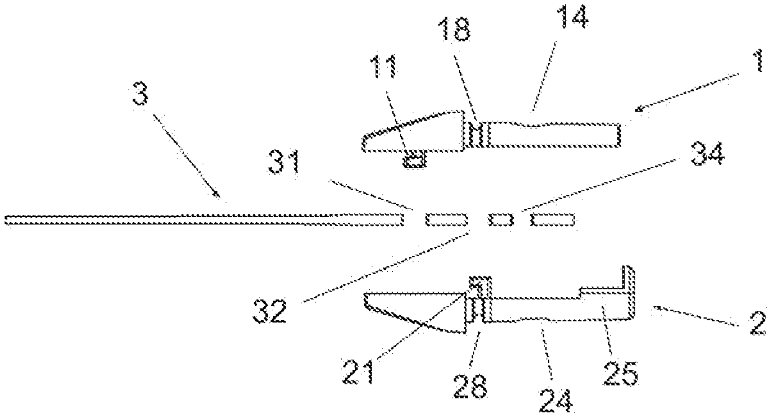
FIG. 2B is a partial structural schematic view of the present invention.
Figure 2C:
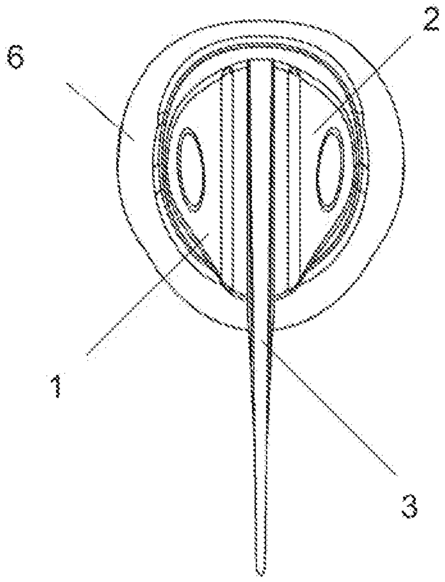
FIG. 2C is a lateral B-B sectional view of the embodiment shown in FIG. 1A.

In FIG. 2A to FIG. 2C, the tail end of the second plate 2 is provided with a boss 25. The boss 25 is in an "L" shape and protrudes towards the direction of the first plate 1, one end of the boss 25 blocks the tail end of the tongue piece 3, and the tongue piece obtains a better support during the reciprocating motion in the axial direction.

In another preferred embodiment, the plates can be provided with flanges 19 and 29, which extend and protrude outwards. The flanges block the outer edges of the upper and lower sides of the tongue piece 3, thereby limiting the up and down swing of the tongue piece 3. The flanges can be arranged on the first plate and/or the second plate. Anyway, the total thickness of the flange shall not exceed the thickness of the tongue piece.

FIG. 2C is a view of the tail end of the handle in the present invention when being looked from the direction of the tongue piece. In order to improve the support of the tool handle during axial rotation, the cross section is elliptical after the first plate 1 and the second plate 2 are buckled with the tongue piece 30, and they are nested in the tube 6 with a matched sectional shape. Further, in addition to an elliptical shape, the cross section can be in a rectangular shape or other non-circular shapes.

In a preferred embodiment, the locking part 5 is a nut, the locking rod 8 is a screw, and the slots 16 and 26 formed through assembly of the first plate 1 and the second plate 2 can limit the movement of the nut, thereby fixing the nut. The user can fasten the screw at the tail end of the tube 6 to tighten the entire handle of the assembly tool.

Figure 2D:
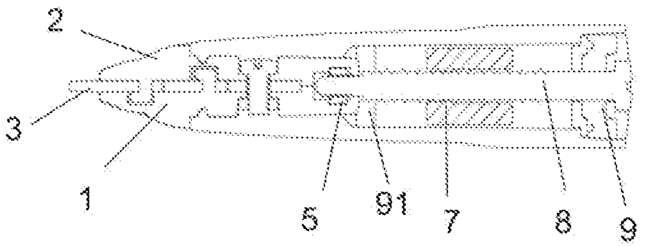
FIG. 2D is a partial structural schematic view of an embodiment of the present invention.
Figure 2E:
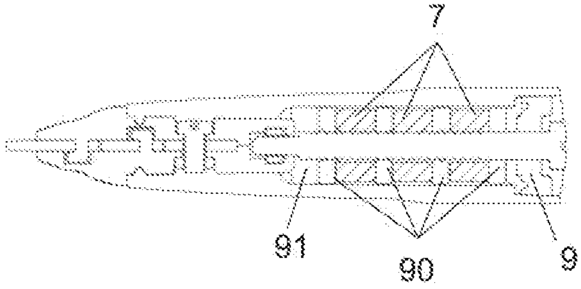
FIG. 2E is a partial structural schematic view of an embodiment of the present invention.

FIG. 2D and FIG. 2E show a technical solution for realizing the function of adjusting the center of gravity in the present invention. FIG. 2D is a front sectional view of the tube, wherein the locking rod 8 is a screw, and the weight unit 7 is hollow in the middle and is provided with internal thread matched with the screw. The position of the tube on the screw can be set by rotating the weight unit 7, thereby providing the user with a simple and convenient method to adjust the center of gravity.

In order to improve the waterproof performance of the tool handle, an inner washer 91 can be provided between the locking rod 8 and the plates 1 and 2 in the inner cavity of the tube 6. The inner washer 91 is hollow in the middle and sleeved on the locking rod 8. The inner washer 91 can adopt an elastic material. When the locking rod 8 is compressed, the inner washer 91 can fill up the inner cavity of the tube 6 to prevent the inflow of water.

The technical solution for realizing the function of adjusting the center of gravity in the present invention is shown in FIG. 2E. More than one weight unit is arranged on the locking rod 8, the weight units 7 are separated with a gasket unit 90, raised grains are arranged on the entire locking rod 8, the gasket unit 90 is made of an elastic material and designed to be hollow in the middle, the inner diameter of the hollow portion is slightly smaller than the outer diameter of the locking rod 8, so that the gasket unit 90 is unable to slide smoothly on the locking rod 8 and can be moved only when the user pushes it, thereby achieving the effect of fixing the weight unit. More than one weight unit enables the user to finely adjust the center of gravity of the tool handle, more adaptive to the need of personalization. Further, the space between the inner cavity of the tube and the weight unit can be filled with filler to stop the movement of the weight unit. If water flows into the tube by accident, it can further reduce the movement of the water inside the inner cavity of the tube.

Another feature of the present invention is the waterproof function. As this tool handle is assembled, the clearances between components are vulnerable to intrusion of water or dirt, affecting hygiene and tool life. More importantly, this tool handle has the function of adjusting the center of gravity, which is achieved mainly by the weight unit in the tube. If water can enter the inner cavity of the tube and flow freely, it will change the center of gravity of the tool during operation and seriously affect the operation performance. For this reason, the present invention further improves the waterproof structure of the tool handle to prevent water from entering the tool handle.

Figure 2F:
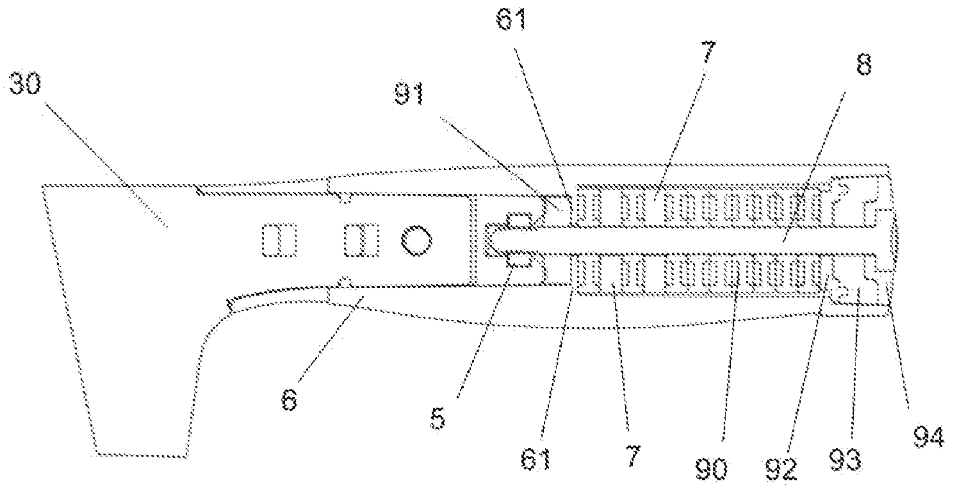
FIG. 2F is a partial structural schematic view of an embodiment of the present invention.

As shown in FIG. 2F, a baffle 61 is arranged in the inner cavity of the tube 6, and extends along the inner wall of the baffle 61 to form a through hole that allows the locking rod 8 to pass through. The baffle 61 divides the inner cavity of the tube 6 into two parts, the end adjacent to the tool head accommodates a tongue piece, a first plate and a second plate, and the other end accommodates a weight unit, filler and a gasket. An inner washer 91 is arranged between the baffle 61 and the locking part 5. When the locking rod 8 and the locking part 5 are tightened, they compress the inner washer 91. The filler can be a group of filling gasket units 90 and fill the inner cavity of the tube 6 to prevent the inflow of water.

In another embodiment, the gasket at the end of the tube 6 is also modified to prevent water from entering the inner cavity of the tube from the end of the tube 6. As shown in FIG. 2F, the end of the tube 6 is provided with a placement groove, and inside the placement groove, an inner gasket 92, a soft gasket 93 and an outer gasket 94 are placed in turn, and the outer gasket 94 is exposed. The locking rod 8 runs through the inner gasket 92, the soft gasket 93 and the outer gasket 94. When the locking rod 8 and the locking part 5 are tightened, they compress the soft gasket 93 to seal the inner cavity of the tube 6 and prevent the inflow of water.

To address the need of personalization, the tool handle of the present invention is modified so that the user can identify the tool from the marker at the end of the handle. When there are multiple tools on the tool shelf, the user can take the needed tool from the handle tail. Specifically speaking, the exposed outer gasket can be configured with different colors for identification. Further, the outer gasket is a transparent material, and there is a marker between the soft gasket and the outer gasket, such as cardboard or rubber ring, which can be configured by the user. The transparent soft gasket 93 allows users to distinguish different tools through the tail of the tool handle.

As shown in FIG. 3A to FIG. 3F, the present invention provides a further technical solution. Below the assembly method and working principle of the components in the present invention are explained in a more specific manner Most of the tool handles that need to be assembled need to be fixed with many different components and fine parts. The present invention only needs a few components, simple steps and easy locking actions to assemble a reliable tool handle, and the assembly process can be controlled easily and will not cause any danger to the tool or user.

Figure 3A:
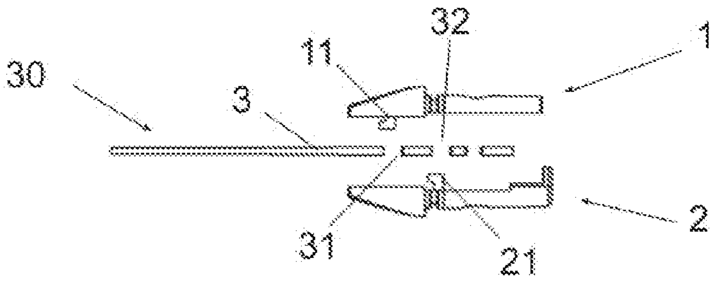
FIG. 3A to FIG. 3F are schematic views of the assembly method of the tool handle provided by the present invention.

As shown in FIG. 3A, at the beginning of the assembly, a first plate 1, a second plate 2 and a tongue piece 3 that has been connected to a functional part 30 are needed. The buckles on the plates are aligned and pass through corresponding through holes 31 and 32 on the tongue piece. This example begins with the second plate 2. That is, the second buckle 21 is aligned with the through hole 32, and then they are engaged with each other.

Figure 3B:
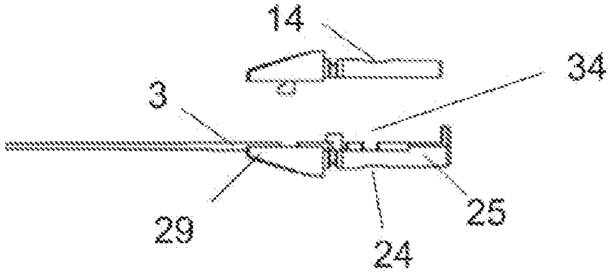

As shown in FIG. 3B, the first buckle 11 on the first plate 1 is aligned and passes through the corresponding through hole 31 on the tongue piece 3. The tongue piece is pushed towards the tail end of the tool handle until the tongue piece is against the boss 25. Now the fixing holes 14, 24 and 34 have been aligned and are ready for the next step of locking the plates.

Figure 3C:
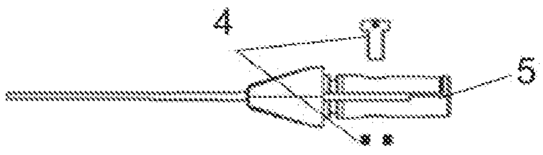

As shown in FIG. 3C, the fixing part 4 is a screw and nut structure, and can be concealed in three fixing holes 14, 24 and 34 in full length. Before the fixing part 4 is engaged and fixed, the locking part 5, a nut for example, is put in the groove at the tail ends of the first plate and the second plate at first, and then the fixing part 4 is used to fix the first plate and the second plate, thereby concealing the locking part 5 in the plates.

Figure 3D:
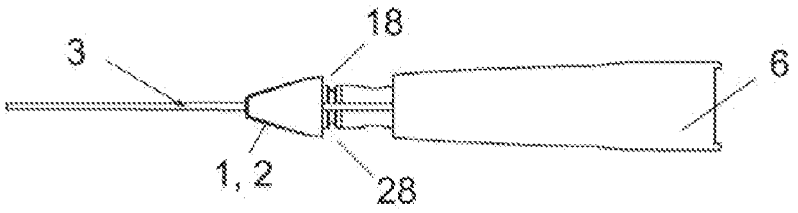

As shown in FIG. 3D, the first plate and the second plate have been locked, and an outer gasket can be further nested in the outer pits 18 and 28. An inner washer is placed in the inner cavity of the tube 6 and against the baffle, and then the combining components of the tongue piece, the first plate and the second plate are put in the inner cavity of the tube 6 and are against the inner washer.

Figure 3E:
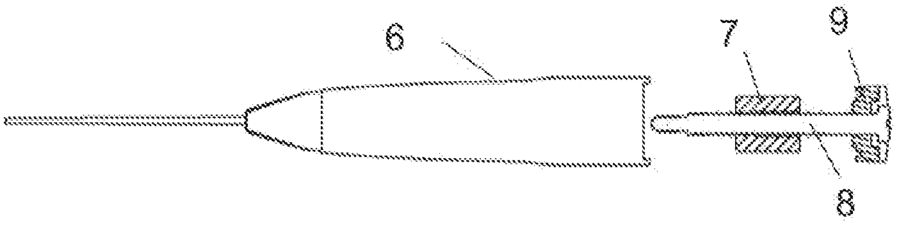

As shown in FIG. 3E, the locking rod 8 is a screw. The user puts the gasket 9, the weight units 7 and the inner washer 91 on the locking rod 8 in order, and adjusts the positions and quantity of the weight units 7 as needed. Alternatively, other weight units can be added and separated with gasket units, or other filler and weight units can be added to fill up the tube. The adjusted locking rod 8 (screw) is inserted into the other side of the tube 6, aligned with the locking part 5 (nut) and fastened. The locking rod 8 will compress the gasket 9 into the tube 6 and seal the inner cavity of the tube 6 to further tighten the plates inside the tube 6.

Figure 3F:
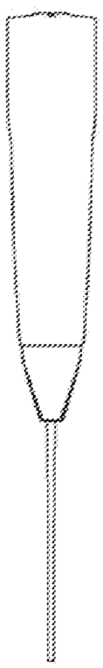

FIG. 3F shows an assembled tool handle of the present invention. Judging from the surface, the tool handle has no difference from general tool handles.

The tool handle provided by the present invention can be installed and disassembled conveniently, the center of gravity of the knife can be adjusted, facilitating the adjustment of the user, alleviating hand discomfort of the user and meeting the personalized demands of the users for different handles. On the other hand, the present invention provides a simple assembly tool handle, and through a few simple components and easy steps, a durable and firm tool handle can be assembled.

The invention claimed is:

1. A handle of assembly tool with an adjustable center of gravity, comprising a tongue piece, which are connected to a functional part in the tool, wherein three through holes are formed in the tongue piece;

a tube connected with the tongue piece, the tube having the first end and the second end;

a first plate and a second plate arranged on the first end of the tube and sandwiching the tongue piece, the first plate being provided with a first buckle, a first slot, a first fixing hole and a first groove, the second plate being provided with a second buckle, a second slot, a second fixing hole and a second groove;

a fixing part formed in the first slot and the second slot;

a locking part formed in the first groove and the second groove;

a gasket formed at the second end of the tube;

a locking rod passing through the gasket and having a first end engaged with the locking part and the second end attached to the gasket; and a weight unit provided on the locking rod in the tube.

2. The tool handle according to claim 1, wherein the first buckle is matched with the second slot, and the second buckle is matched with the first slot.

3. The tool handle according to claim 1, wherein the locking part is a nut, and the locking rod is a screw.

4. The tool handle according to claim 1, wherein the fixing part is a screw and a nut.

5. The tool handle according to claim 1, wherein an inner washer is further provided between the locking part and the locking rod.

6. The tool handle according to claim 5, wherein the inner cavity of the tube is provided with a baffle between the inner washer and the locking part and against the inner washer.

7. The tool handle according to claim 1, wherein at least two weight units are connected with the locking rod, and are mutually separated with a gasket unit.

8. The tool handle according to claim 1, wherein a flange is arranged on the first plate or the second plate, extends and protrudes along the outer edge of the tongue piece, and blocks the tongue piece from swinging up and down.

9. The tool handle according to claim 1, wherein outer pits are arranged on the outer surfaces of the first plate and the second plate, and an outer gasket is nested in the outer pits.

10. The tool handle according to claim 1, wherein the gasket comprises an inner washer, a middle gasket and an outer gasket in turn, and the outer gasket is exposed.

* * * * *